United States Patent [19]

Iwami

[11] Patent Number: 5,566,057
[45] Date of Patent: Oct. 15, 1996

[54] ENGAGING MEMBER SECURING STRUCTURE FOR VEHICULAR LAMP

[75] Inventor: Akihisa Iwami, Shizuoka, Japan

[73] Assignee: Koito Manufacturing Co., Ltd., Tokyo, Japan

[21] Appl. No.: 458,262

[22] Filed: Jun. 2, 1995

[30] Foreign Application Priority Data

Jun. 8, 1994 [JP] Japan ..................................... 6-151611

[51] Int. Cl.6 ....................................................... B60Q 1/00
[52] U.S. Cl. .................................. 362/61; 362/80
[58] Field of Search ................................ 362/61, 80, 368

[56] References Cited

U.S. PATENT DOCUMENTS 4,920,460  4/1990  Mori ............................................. 362/61
5,121,303  6/1992  Shirai et al. ................................. 362/61
5,343,370  8/1994  Ohashi et al. ............................... 362/61

Primary Examiner—Carroll B. Dority
Attorney, Agent, or Firm—Sughrue, Mion, Zinn, Macpeak & Seas

[57] ABSTRACT

An engaging member securing structure for a vehicular lamp having a lamp body and a front lens covering a front opening of the lamp body to define a lamp chamber, in which a hollow projecting member having a predetermined length projects from a rear surface of the lamp body for securing the engaging member to a vehicle body. A partition wall is formed inside the hollow projecting member at approximately the mid portion thereof to divide the inside of the hollow projecting member. The thickness of the partition wall is less than that of the wall of the hollow projecting member.

29 Claims, 7 Drawing Sheets

ENGAGING MEMBER SECURING STRUCTURE FOR VEHICULAR LAMP

BACKGROUND OF THE INVENTION

The present invention relates to an engaging member securing structure for a vehicular lamp in which a hollow member projecting from the rear surface of a lamp body employed for securing the lamp body to a vehicle body has improved mechanical strength. The invention also relates to a vehicular lamp employing such an engaging member securing structure.

Conventionally, there has been known a vehicular lamp having a frontward-opening lamp housing member assembled to a corner portion of a vehicle, and a lamp body having a surface which curves from the front of the vehicle to the side thereof and which is mounted in the lamp housing member and secured to the vehicle body at plural portions on the rear surface of the lamp body.

The conventional vehicular lamp of this type is provided, as shown in FIG. 11, with a lamp body 51 having an opening periphery on which a securing groove 52 is formed, and a front lens 54 having a peripheral portion on which a leg member 54a is formed, which leg member 54a is fitted in and adhered to the securing groove 52 of the lamp body. The assembled lamp body 51 and the front lens 54 together define a lamp chamber 55. A plurality of boss-shaped hollow projecting bodies 56 project from predetermined portions on the rear surface of the lamp body 51, and an engaging member 57 such as a stud bolt is fixed to the outer end of each of the hollow projecting members 56. The projecting end of the engaging member 57 is inserted through a packing 58 in a securing hole B formed in an inner wall of a lamp housing member A of the vehicle body, and the lamp body 51 is integrally secured to the vehicle body by means of a threaded fastener such as a nut 59 or the like.

According to the conventional securing structure as described above, in the case where the vehicular lamp is of a combination type lamp having a plurality of lamp chambers 55, 55, because the rear surface of the lamp body 51 and the inner wall of the lamp housing member A of the vehicle body are rather far from one another, a long hollow projecting member 56 must be provided. This member 56 must be molded using a mold core M as shown in FIG. 12. Further, such a member must be formed continuously with a partition wall 61, which is continuous with a reflector 60 formed on the inner surface of the lamp body 51, in order to cover the rear opening of the hollow projecting member 56 so as to prevent degradation of the external appearance of the lamp due to the opening, which would be visible through the front lens 54 were the rear opening not closed in this manner.

However, the mechanical strength of the elongated hollow projecting member 56 is low with respect to a force or an impact applied thereto from the side, and the hollow projecting member 56 can easily be bent or broken if an excessive force or impact is applied thereto when the engaging member 57 is secured during assembly. Thus, the reliability in mechanical strength of such a structure has been low.

Further, during the molding operation used to produce the hollow projecting member 56 having an elongated hollow part using the mold core M, the hollow part of the hollow projecting member 56 may abut against the mold core M when the molded product is removed from the mold core M, thus lowering the workability during the molding. In some cases, the hollow projecting member 56 or the mold core M may even be damaged or broken.

SUMMARY OF THE INVENTION

The present invention was made in view of the foregoing problems accompanying the conventional securing structure. Accordingly, an object of the present invention is to provide an engaging member securing structure for a vehicular lamp in which the mechanical strength of a boss for securing the vehicular lamp to a vehicle body is improved, and also the workability during molding is improved while avoiding damage to the mold core.

The above and other objects can be achieved by the provision of an engaging member securing structure for a vehicular lamp having a lamp body and a front lens for covering the front opening of the lamp body and to define a lamp chamber together with the lamp body, in which, according to the present invention, a hollow projecting member having a predetermined length projects from the rear surface of the lamp body for securing the engaging member to a vehicle body, a partition wall is formed inside the hollow projecting member at substantially the mid part thereof dividing the inside of the hollow projecting member, wherein the thickness of the partition wall is made less than that of the outer wall of the hollow projecting member. The hollow projecting member is preferably circular in cross section.

The engaging member is preferably constituted by a stud bolt having a threaded portion at one side and an embedded portion at the other side which is subjected to knurl processing, a stud nut having a nut portion at one side and an embedded portion at the other side, or a stud pin having a fixing pin press-fitted into a fixing hole formed on the vehicle body and an embedded portion.

According to the structure of the present invention, since the partition wall is formed at substantially the mid part inside the hollow projecting member extending from the rear surface of the lamp body, the mechanical strength of the hollow projecting member is enhanced, so that the vehicular lamp can be securely fixed to the lamp housing member of the vehicle body.

Further, since the hollow projecting member is molded in such a manner that the partition wall is formed at substantially the mid portion on the inside thereof, the mold core for molding the hollow projecting member of the lamp body can be made relatively short, and therefore the mold core can be readily removed from the molded product during the molding process of the lamp body, so that there is less chance of damage to the mold core or the lamp body during the molding process.

DESCRIPTION OF THE PREFERRED EMBODIMENTS

Figure 1:
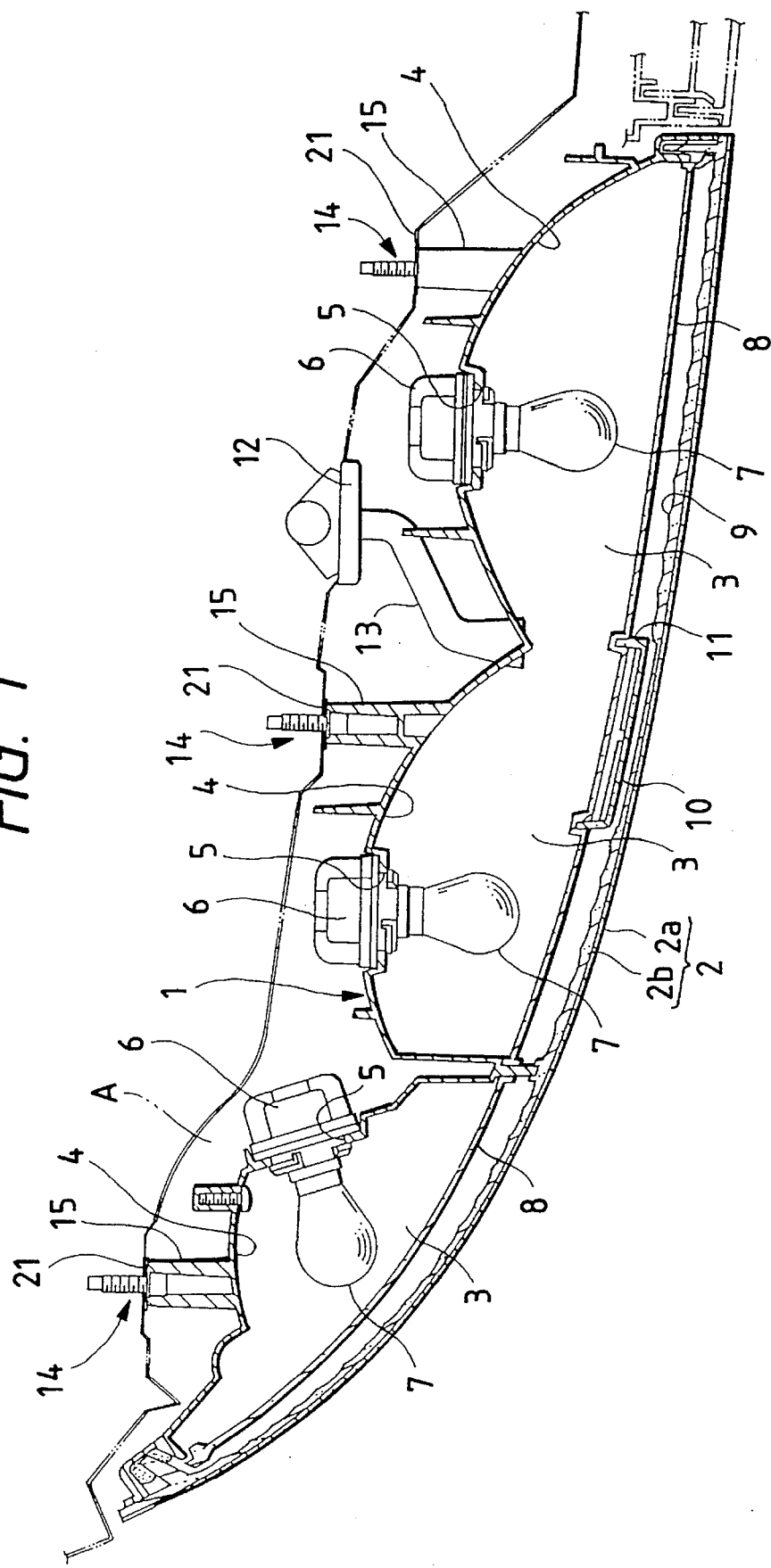
FIG. 1 is plan sectional view showing a securing structure of an engaging member for a vehicular lamp.
Figure 2:
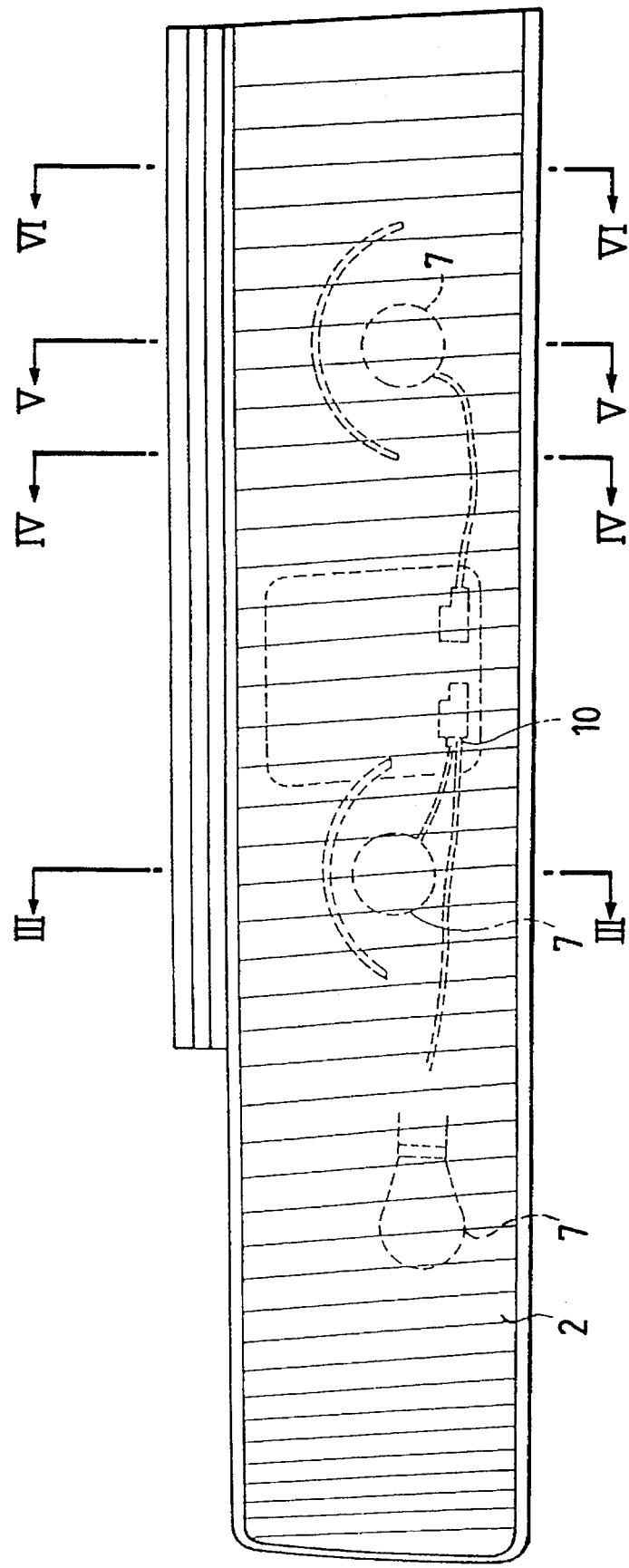
FIG. 2 is a front view of the vehicular lamp shown in FIG. 1.
Figure 3:
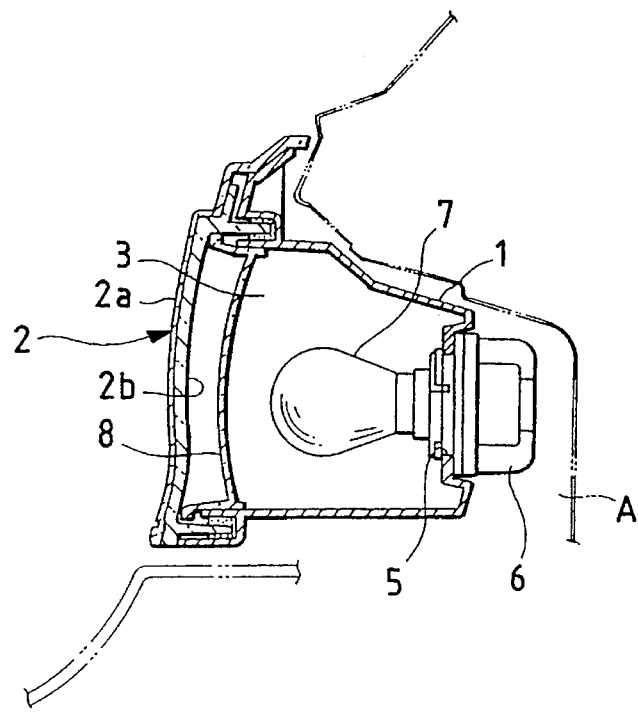
FIG. 3 is a cross-sectional view of the lamp taken along line III—III in FIG. 2.
Figure 4:
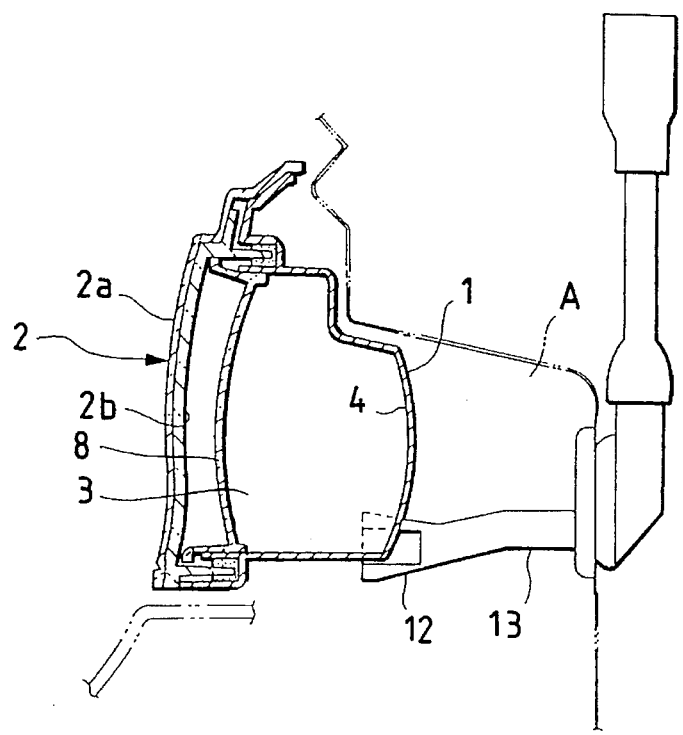
FIG. 4 is a cross-sectional view of the lamp taken along line IV—IV in FIG. 2.
Figure 5:
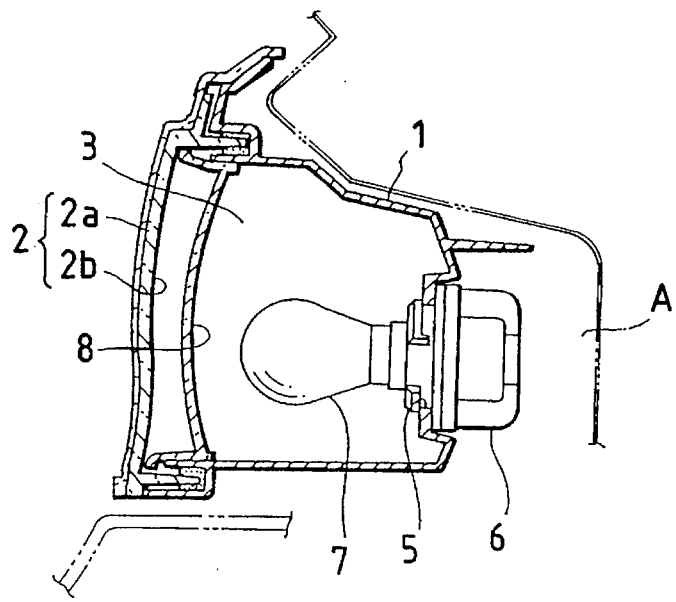
FIG. 5 is a cross-sectional view of the lamp taken along line V—V in FIG. 2.

Hereinafter, preferred embodiments of a securing structure for a vehicular lamp according to the present invention will now be described in detail with reference to the accompanying drawings.

FIGS. 1 through 6 show a vehicular lamp having an engaging member securing structure according to the present invention.

As shown in the drawings, a vehicular lamp 1, which is of a combination type, is provided with a front opening which curves from front to side to conform to the shape of an inner wall of a lamp housing member A mounted in a corner portion of the vehicle body. The front opening of the lamp 1 is closed by a front lens 2 formed of a synthetic resin such as an acrylic resin to define therein a plurality of lamp chambers 3 for a tail lamp, stop lamp, turn signal lamp, or the like. A plurality of reflectors 4, formed by aluminum deposition or the like, are provided on the inner surface of the lamp body. Socket mounting holes 5 are formed on a rear part of each of the lamp chambers 3 for mounting therein sockets 6 in which bulbs 7 (light sources) are inserted. When the bulbs 7 are turned on, direct light and light reflected by the reflectors 4 of the respective lamp chambers 3 is directed frontward of the lamp through the front lens 2.

Inner lenses 8 formed of a synthetic resin, which may be colored (red or amber) or transparent, are provided at the inner side of the front lens 2 for emitting functional colors of the vehicular lamp. The inner lens 8 is mounted on the lamp body 1 for each of the lamp chambers 3. The front lens 2 is constituted, according to the present invention, by a multilayer of a transparent surface lens 2a and a colored or transparent rear lens 2b attached to the rear surface of the surface lens 2a for emitting the functional colors. If desired, lens steps 9 may be formed on the rear surface of the front lens 2 for diffusing the light.

A reflex reflector 10 molded of a transparent synthetic resin is provided with a supporting edge 11 formed at the peripheral portion thereof. The reflex reflector 10 is supported on the rear surface of the front lens 2 while being supported within the inner lens 8 through the supporting edge 11. The rear surface of the reflex reflector 10 is subjected to a satin finishing treatment to form thereon a diffusion preventing structure so that a dark portion, due to a light shielding effect with respect to the illumination light of the bulb 7, is prevented from occurring in the vicinity of the reflex reflector 10.

A bushing 12 formed of an elastic material such as rubber or the like is fitted in a cord insertion hole for leading a cord 13 arranged at the rear of the lamp body 1 into the lamp housing member A on the side of the vehicle body. The wires of the cord 13 are collected by a cord clamping member, and then the cord 13 passes through the bushing 12. The bushing is constructed in such a manner that waterproofing is maintained.

Figure 7:
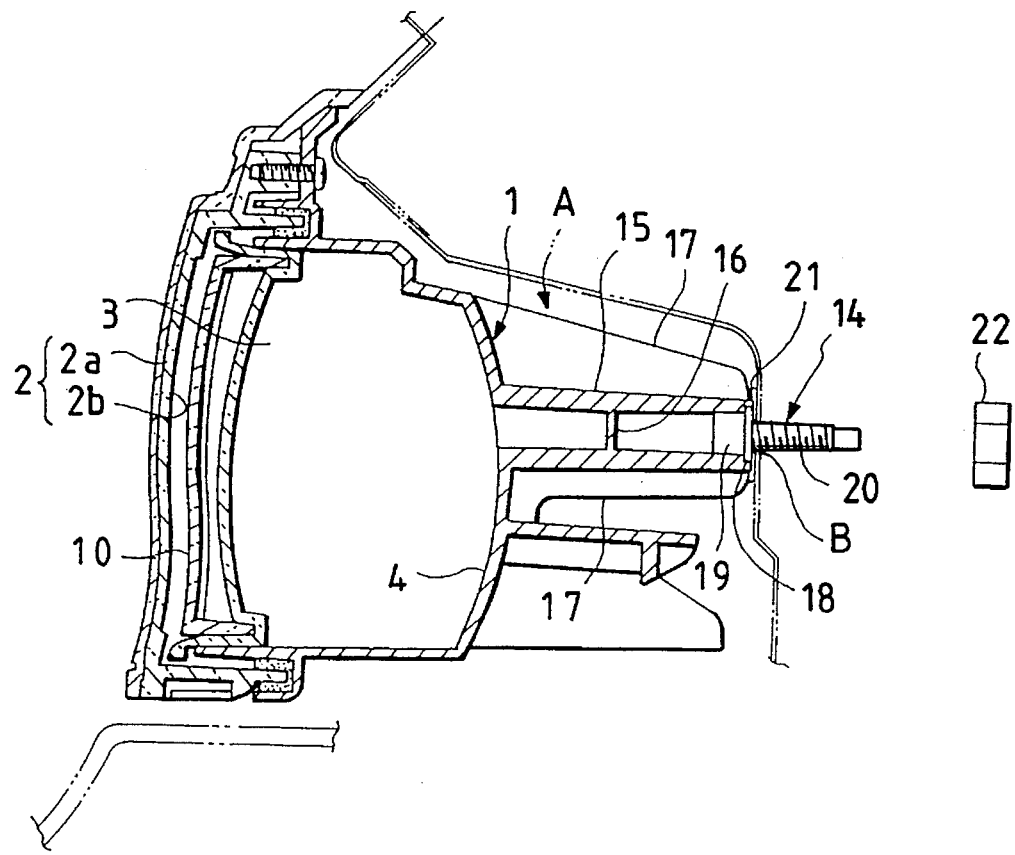
FIG. 7 is a partially enlarged sectional view showing the securing structure of the engaging member.
Figure 8:
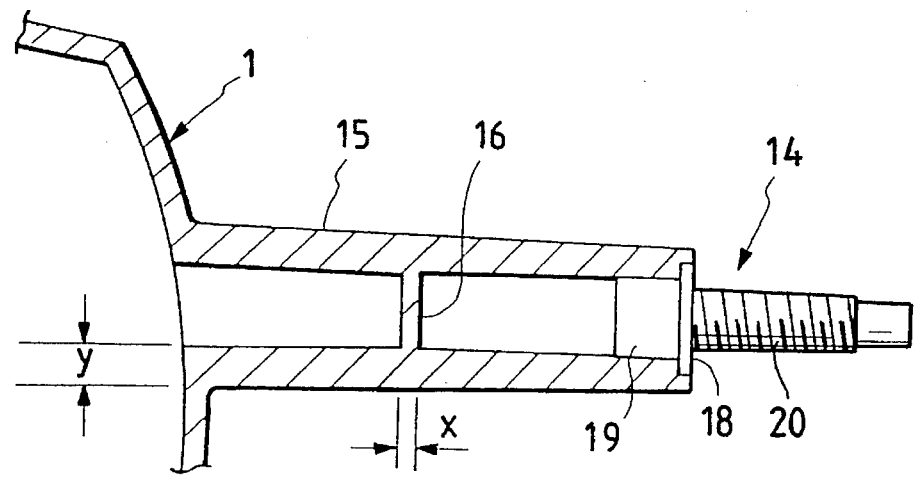
FIG. 8 is an enlarged side sectional view showing the mounting condition of the hollow projecting member and the engaging member.

FIGS. 7 and 8 are cross-sectional views showing a securing structure of the engaging member for a vehicular lamp according to the present invention.

A plurality of hollow projecting members 15 are formed on the rear surface of the lamp body 1 for securing an engaging member 14 such as a stud bolt, stud screw or stud pin for securing the vehicular lamp to the inner wall of the lamp housing member A provided on the vehicle body. The hollow projecting member 15 is provided with an interior partition wall 16 at approximately the mid portion thereof in the longitudinal direction, extending perpendicular to the longitudinal direction and separating the inside of the hollow projecting member 15 into a lamp body side and an engaging member mounting side. The partition wall 16 enhances the mechanical strength of the hollow projecting member 15 against impacts applied in the lateral direction thereof. The lamp body side of the hollow projecting member 15 opens into the lamp chamber 3. The thickness X of the partition wall 16 is, as shown in FIG. 8, made slightly less than the thickness Y of the hollow projecting member 15 (X< Y).

Since the thickness of the partition wall 16 is less than that of the hollow projecting member 15, undesirable shrinkage is prevented from occurring on the outer periphery of the cylindrical wall of the hollow projecting member 15 during molding. If shrinkage were to occur on the outer periphery of the cylindrical wall of the hollow projecting member 15, an impact or stress load applied to the hollow projecting member in the lateral direction thereof would be concentrated in the area of the shrinkage, which could evem cause cracking in some cases. According to the arrangement of the present invention, however, the stress is dispersed over the whole hollow projecting member 15.

Further, since the partition wall 16 is formed at approximately the mid portion of the hollow projecting member 15 according to the invention, the portion of the mold core used for molding the hollow projecting member 15 can be made shorter than in the case of the conventional mold core. Accordingly, the mold core can be readily removed from the molded product at the conclusion of the molding process, thereby reducing the possibility of damage to the mold core or the lamp body.

The hollow projecting member 15 is preferably cylindrically shaped in view of mechanical strength. However, the invention is not limited thereto or thereby. For example, the hollow projecting member 15 may be hexagonal or octagonal in cross section. Further, the outer contour of the hollow projecting member 15 may be polygonal while the inner contour is circular in cross section. In contrast, the outer contour of the hollow projecting member 15 may be circular while the inner contour of which is polygonal in cross section. Furthermore, one or a plurality of ribs 17 or another reinforcing structure may be formed on the hollow projecting member 15 along the axial direction thereof thereby to further improve the mechanical strength of the hollow projecting member 15.

The hollow projecting member 15 thus structured can be made even longer than the conventional projecting member and, accordingly, in a case where a large clearance exists between the lamp housing member A on the vehicle side and the rear surface of the lamp body of the vehicular lamp, the vehicular lamp can be assembled onto the vehicle body extremely easily. The workability during the assembly of the vehicular lamp to the vehicle is thus improved. Moreover, the lamp with the structure of the invention is applicable to a variety of sizes of the lamp housing member A.

Figure 6:
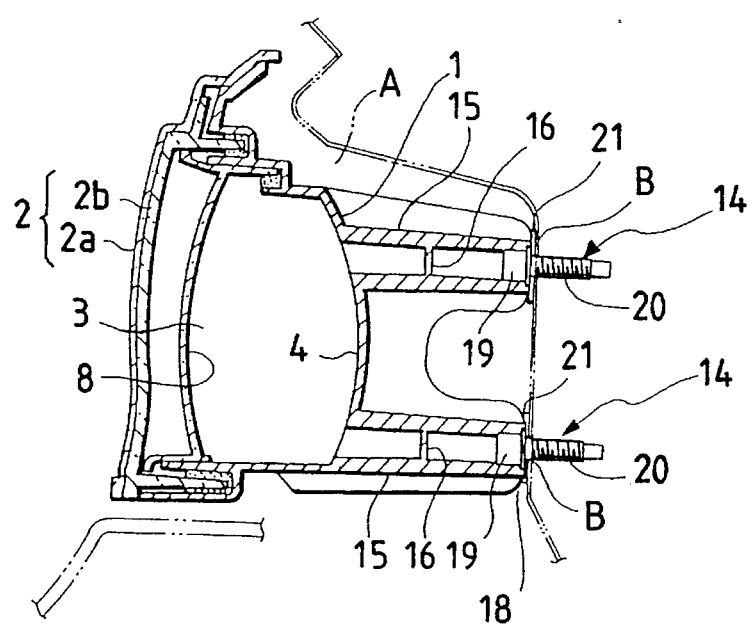
FIG. 6 is a cross-sectional view of the lamp taken along line VI—VI in FIG. 2.

The hollow projecting member 15 as described above is preferably disposed at an appropriate position so that the opening portion of the hollow projecting member 15 into the lamp chamber 3 does not reduce the reflection efficiency of the lamp or degrade the external appearance of the lamp. For example, as shown in FIG. 6, a pair of hollow projecting members 15 can be disposed at a rear position of the reflex reflector 10, while in another arrangement the hollow projecting member 15 is disposed at a position which is covered by a colored inner lens 8 so that the inside of the lamp chamber 3 cannot be seen through the front lens 2.

Further, hollow projecting members 15 may be disposed at plural positions on the rear surface of the lamp body 1. The number of the hollow projecting members 15 may be varied and desirably chosen in accordance with the size of the lamp body 1 and the configuration of the inner wall of the lamp housing member A on the vehicle body side.

In a case where a stud bolt is employed as the engaging member 14, as shown in FIG. 8, the bolt is divided into two parts by a flange 18 formed integrally therewith, that is, one part forms an embedded portion 19 which is subjected to knurl processing, while the other part forms a threaded portion 20. The embedded portion 19 of the stud bolt 14 is press-fitted into the cylinder from the opening of the hollow projecting member 15, and prevented from rotating by means of a frictional braking force generated between the embedded portion 19 and the inner peripheral surface of the hollow projecting member 15. The threaded part 20 of the stud bolt 14, which is thus fixed to the hollow projecting member 15, is inserted into a fixing hole B formed at the corresponding portion in the lamp housing member A on the vehicle side, and then a nut 22 is engaged with the threaded part 20 so that the vehicular lamp is secured to the vehicle body.

A part of the engaging member 14 may be constituted by an aiming screw (not shown) for adjusting the mounting angle of the lamp body with respect to the lamp housing member A of the vehicle body. The inclination of the illumination pattern emitted from the lamp can be adjusted in the vertical and horizontal directions by rotating the aiming screws.

Figure 9:
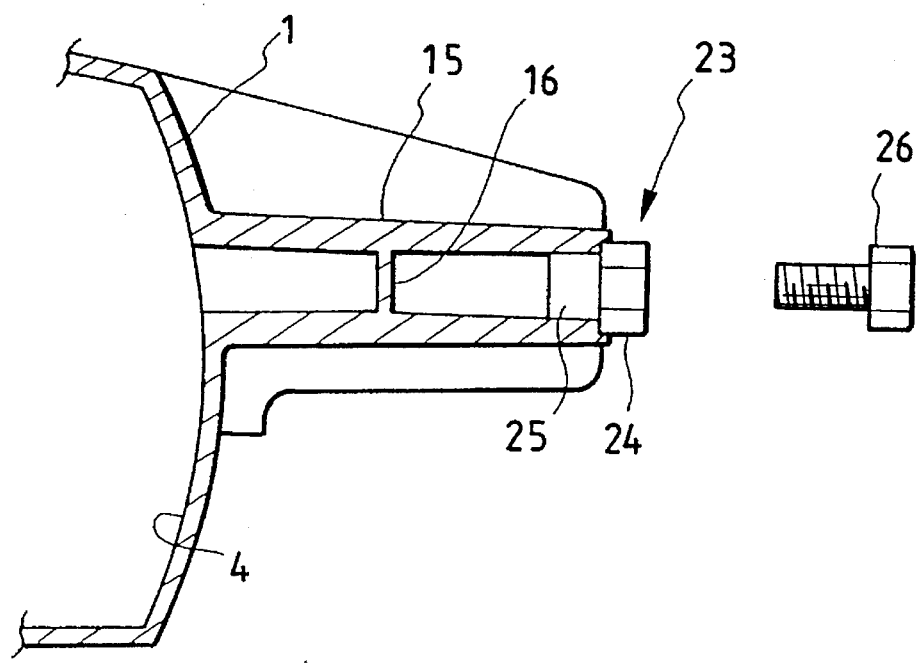
FIG. 9 is a partially enlarged side sectional view of the engaging member according to another embodiment of the present invention.
Figure 10:
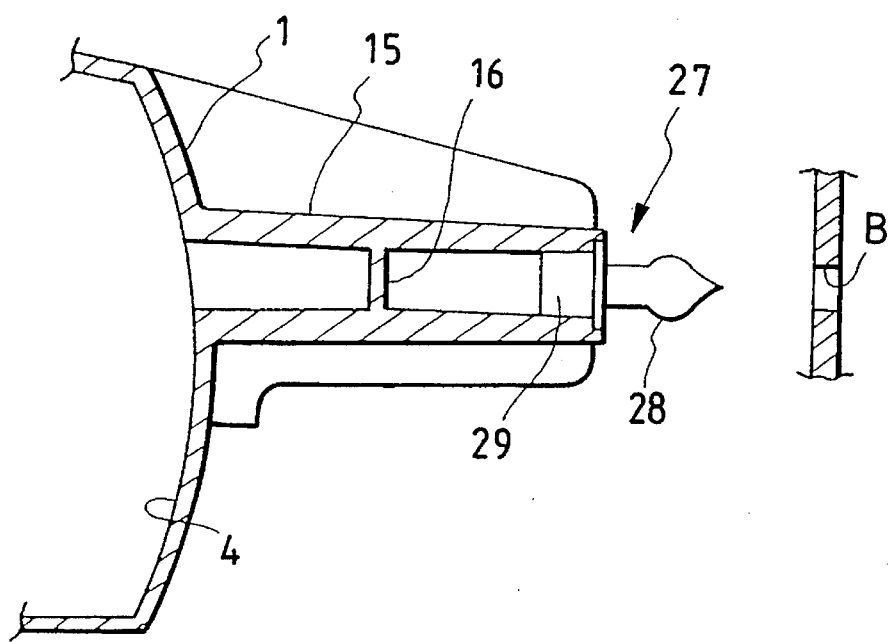
FIG. 10 is a partially enlarged side sectional view of the engaging member according to still another embodiment of the present invention.
Figure 11:
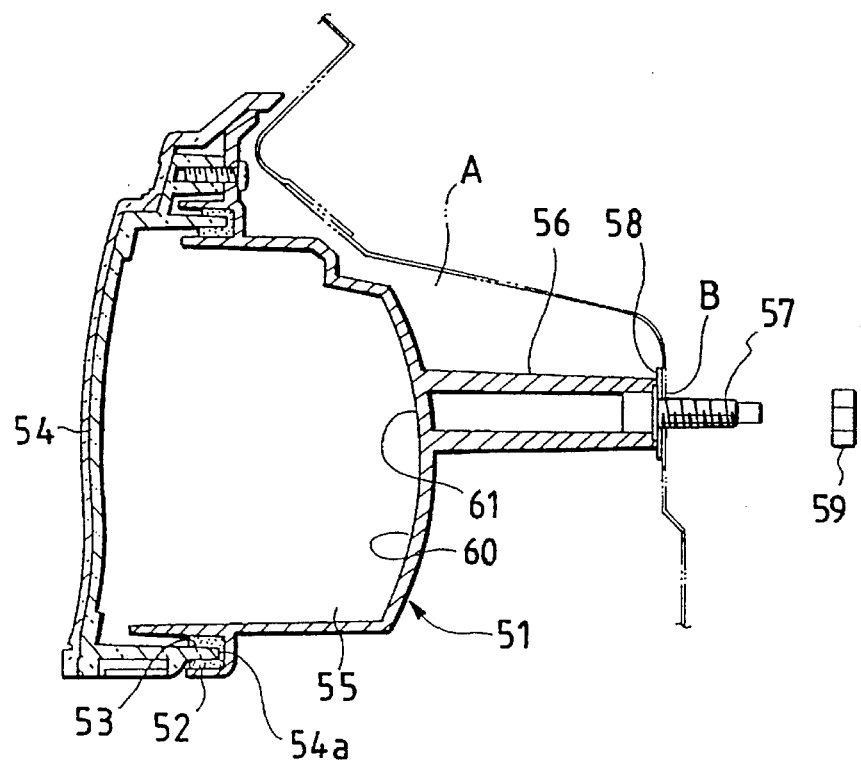
FIG. 11 is a side sectional view showing a conventional securing structure of an engaging member for a vehicular lamp.
Figure 12:
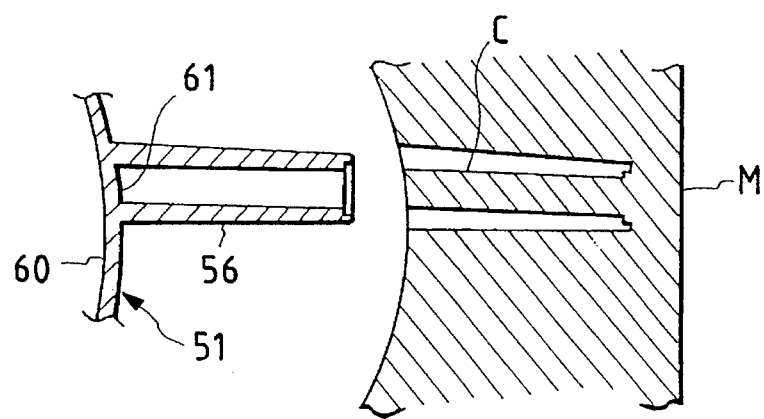
FIG. 12 is an explanatory view showing the relationship between a mold core for molding a conventional hollow projecting member serving as a securing structure and the hollow projecting member.

FIGS. 9 and 10 are sectional views showing a securing structure of an engaging member for a vehicular lamp according to another embodiment of the present invention.

The structure shown in FIG. 9 employs a stud bolt 23 functioning as the engaging member for engaging the hollow projecting member 15. The stud bolt 23 is provided integrally with a nut member 24 formed at one side, and an embedded member 25 formed at the other side which is subjected to knurl processing. A bolt 26 is threadedly inserted into the nut member 24 through a through hole formed in the lamp housing member A to thus secure the lamp. On the other hand, the structure shown in FIG. 10 employs a stud pin 27 serving as the engaging member for engaging with the hollow projecting member 15. With this structure, a fixing pin part 28 is press fitted into the fixing hole B formed in the lamp housing member A to secure the vehicular lamp to the vehicle body. The stud pin 27 is provided integrally with the fixing pin part 28, which has a sharp end formed at one side and an embedded part 29 which is subjected to knurl processing.

With the securing structure of the engaging member for a vehicular lamp according to the present invention constituted as described above, the mechanical strength of the hollow projecting member is enhanced, and further the mold core for molding the hollow projecting member of the lamp body can be operated easily, thereby to reduce the chance of damage to the mold core or the lamp body during the molding process.

What is claimed is:

1. A lamp securing structure for a vehicular lamp, comprising:

a hollow projecting member projecting from a rear surface of the vehicular lamp for securing said lamp to a vehicle body; and an engaging member for engaging the hollow projecting member to the vehicle body; and a partition wall formed inside said hollow projecting member substantially at a mid portion thereof.

2. The lamp securing structure according to claim 1, wherein the thickness of said partition wall is less than the wall thickness of said hollow projecting member.

3. The lamp securing structure according to claim 1, wherein said hollow projecting member is circular in cross section.

4. The lamp securing structure according to claim 1, wherein said hollow projecting member is hexagonal in cross section.

5. The lamp securing structure according to claim 1, wherein said hollow projecting member is octagonal in cross section.

6. The lamp securing structure according to claim 1, wherein an outer contour of said hollow projecting member is polygonal while an inner contour thereof is circular in cross section.

7. The lamp securing structure according to claim 1, wherein an outer contour of said hollow projecting member is circular while an inner contour thereof is polygonal in cross section.

8. The lamp securing structure according to claim 1, wherein said hollow projecting member comprises at least one reinforcing leg extending in an axial direction thereof.

9. The lamp securing structure according to claim 8, wherein said reinforcing leg comprises a rib.

10. The lamp securing structure according to claim 1, wherein said engaging member comprises a stud bolt and a flange formed integrally with said stud bolt for dividing said bolt into a first part forming an embedded portion, said embedded portion being subjected to the knurl processing, and a second part forming a threaded portion.

11. The lamp securing structure according to claim 1, wherein said engaging member comprises a stud nut.

12. The lamp securing structure according to claim 1, wherein said engaging member comprises a stud pin comprising a fixing pin part having a sharp end formed at a first side and an embedded part at a second side subjected to knurl processing.

13. A vehicular lamp comprising:

a lamp body having a front opening;

a reflector formed on an inner surface of said lamp body;

a front lens covering said front opening of said lamp body, a lamp chamber being defined between said lamp body and said front lens;

a hollow projecting member projecting from a rear surface of said lamp body for securing said lamp body to a vehicle body; and an engaging member for engaging said hollow projecting member to the vehicle body; and a partition wall formed inside said hollow projecting member substantially at a mid portion thereof.

14. The vehicular lamp according to claim 13, wherein the thickness of said partition wall is less than the wall thickness of said hollow projecting member.

15. The vehicular lamp according to claim 13, wherein said hollow projecting member is circular in cross section.

16. The vehicular lamp according to claim 13, wherein said hollow projecting member is hexagonal in cross section.

17. The vehicular lamp according to claim 13, wherein said hollow projecting member is octagonal in cross section.

18. The vehicular lamp according to claim 13, wherein an outer contour of said hollow projecting member is polygonal in cross section while an inner contour thereof is circular in cross section.

19. The vehicular lamp according to claim 13, wherein an outer contour of said hollow projecting member is circular in cross section while an inner contour thereof is polygonal in cross section.

20. The vehicular lamp according to claim 13, wherein said hollow projecting member comprises at least one reinforcing leg extending in an axial direction thereof.

21. The vehicular lamp according to claim 20, wherein said reinforcing leg comprises a rib.

22. The vehicular lamp according to claim 13, further comprising a reflex reflector mounted on said front opening of said lamp body at an inner portion of said front lens.

23. The vehicular lamp according to claim 13, further comprising a colored inner lens mounted on said front opening of said lamp body at an inner portion of said front lens.

24. The vehicular lamp according to claim 23, wherein said inner lens has an amber color.

25. The vehicular lamp according to claim 23, wherein said inner lens is red colored.

26. The vehicular lamp according to claim 23, wherein said inner lens is transparent.

27. The vehicular lamp according to claim 13, wherein said front lens comprises a transparent surface lens and a rear lens attached to a rear surface of said surface lens.

28. The vehicular lamp according to claim 13, wherein said front lens comprises light-diffusing lens steps formed on a rear surface thereof.

29. The vehicular lamp according to claim 13, wherein a part of said engaging member is constituted by an aiming bolt for adjusting a mounting angle of the lamp body with respect to the lamp housing member of the vehicle body.

* * * * *